May 2, 1967  D. R. BURTON  3,316,732
APPARATUS FOR CONTROLLING THE TEMPERATURE OF THE HUMAN BODY
Filed March 27, 1964  5 Sheets-Sheet 4

United States Patent Office 3,316,732
Patented May 2, 1967

3,316,732
APPARATUS FOR CONTROLLING THE TEMPERATURE OF THE HUMAN BODY
Derek Rodney Burton, Farnborough, England, assignor to Minister of Aviation in Her Majesty's Government of the United Kingdom of Great Britain and Northern Ireland, London, England
Filed Mar. 27, 1964, Ser. No. 355,390
Claims priority, application Great Britain, Apr. 5, 1963, 13,635/63
2 Claims. (Cl. 62—259)

This invention relates to apparatus for controlling the temperature of the human body by means which heat or cool the skin. An example of such systems is a ventilated pressure suit as is worn by an aviator which, conventionally, includes means for distributing a flow of cooling and ventilating air over the body of the wearer and exhausting it from the suit. The temperature and flow rate of the air are adjusted to provide the conditions the wearer requires.

A disadvantage of the known apparatus in which air is the heating or cooling fluid is that because of its low density and low specific heat large volumes of air are required to obtain the necessary conditions. Consequently a relatively large amount of power is required to circulate the air.

According to the present invention, apparatus for controlling the temperature of the human body comprises a garment worn on the body and a system of liquid carrying pipes positioned inside the garment to come in contact with the skin, the pipes running generally from the extremities towards the centre of the body in the region of the abdomen, together with a first manifold connected to the open ends of the pipes at the extremities of the body and a second manifold connected with the opposite open ends of the pipes at the centre of the body, the manifolds being connected through means for circulating the heating or cooling liquid in a circuit including the manifolds, the pipes and a heat exchanger in which its temperature is adjusted.

Preferably the apparatus is so adapted that, when it is used for cooling, the liquid flows from the extremities of the body towards the centre, that is to say from the cooler parts of the body towards those which are warmer whereby, as the liquid flows to progressively warmer parts a small and relatively constant temperature differential will be maintained between the liquid and the body temperatures.

Advantageously and preferably the cooling liquid is water.

The heat exchanger may take several forms as follows.

For cooling it may comprise a chamber in which a refrigerant liquid is expanded and evaporated to give a cooling effect, which chamber is enclosed by a jacket through which the suit cooling liquid circulates, the rate of cooling being adjusted by the rate at which the expanding refrigerant liquid is permitted to enter the expansion chamber. The expansion chamber may be conveniently termed an evaporator and be evacuated to a low pressure, that is to say be a closed chamber either including or connected with a component or auxiliary chamber which contains a hygroscopic agent or a desiccant which absorbs the evaporated liquid. Conveniently the evaporator chamber is evacuated mechanically but, in the case in which the apparatus is designed for operation as part of a garment worn by a man in space or on the surface of a celestial body in which environmental pressure is very low or equivalent to the evacuation pressure required in the evaporating chamber, the chamber may simply be left open to atmosphere. The refrigerant liquid may be bled from the suit cooling liquid, in which case the period of operation of the apparatus will be governed by the rate of cooling that is required and the capacity of the suit coolant carrying pipe system.

As an alternative to using a jacket around the evaporator chamber as the heat exchanger, the chamber may contain within it a separate heat exchanger of conventional form comprising a duct for the water which is to be cooled passing through a matrix including external fins constituting secondary cooling surfaces this exchanger being positioned within the evaporator chamber so that the expanded cooling liquid in vaporous form flows through the matrix in passing to the desiccant or the environment as the case may be. It is to be understood, of course that in the case in which the evaporator chamber is open to environment that it will be usually necessary to provide an expansion nozzle at the outlet end, that is to say on the downstream side of the heat exchanger contained within the evaporator chamber, in order to ensure that an appropriate pressure drop will be created whilst maintaining a pressure of necessary minimum value within the evaporator chamber.

Those forms of the apparatus in which a heat exchanger is contained within the evaporator chamber are particularly suitable for incorporation in portable cooling apparatus in which the expanded liquid may be and is preferably water, and is entirely separate from the cooling liquid, which again is preferably water circulating within the pipework of the garment. Conveniently the expanding liquid may be contained in a transparent vessel which enables the user to assess visually the effective operating period of the apparatus.

In another form in which the apparatus is again to be used for cooling, the cooling liquid is circulated through a chamber full of crushed melting ice the amount passing through and the degree of cooling being governed by a three-way valve which by-passes a proportion of the cooling water only through the crushed ice chamber as is necessary to maintain a mixed output at a predetermined temperature, the mixed output consisting in part of liquid which has passed through the chamber and in part of liquid which has been supplied directly from the three-way valve. Once again the period of operation for this form of cooler will depend on the time required to melt the ice and raise the melted ice to a temperature at which it no longer has any beneficial cooling effect. The three-way valve may be thermostatically controlled so that the amount of water or cooling liquid which it passes through the cooling chamber and by-passes is governed to maintain the mixed output from the cooling and the by-pass at the required temperature.

If the apparatus is to be used for applying heat to the wearer then the pipe circuit containing the liquid which is pumped through the suit may again include a heat exchanger which is housed within a duct through which heat is applied. The heat may be derived from an electrical source or by burning gas or a compressed liquid fuel such as butane.

The invention will now be described with reference to the accompanying diagrammatic drawings in which.

Figure 2:
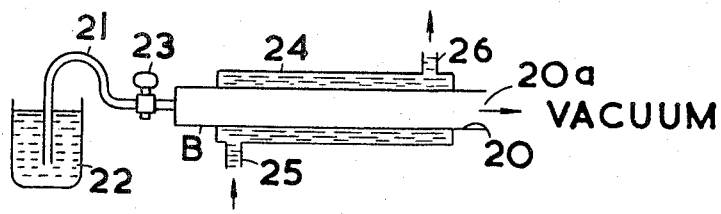
FIGURE 2 shows a basic form of evaporator.
Figure 3:
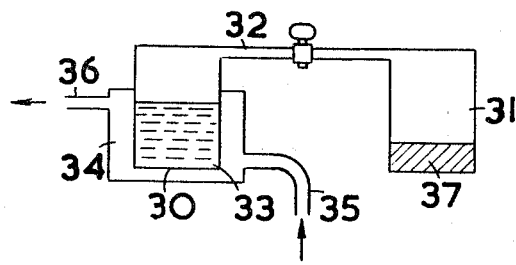
Figure 4:
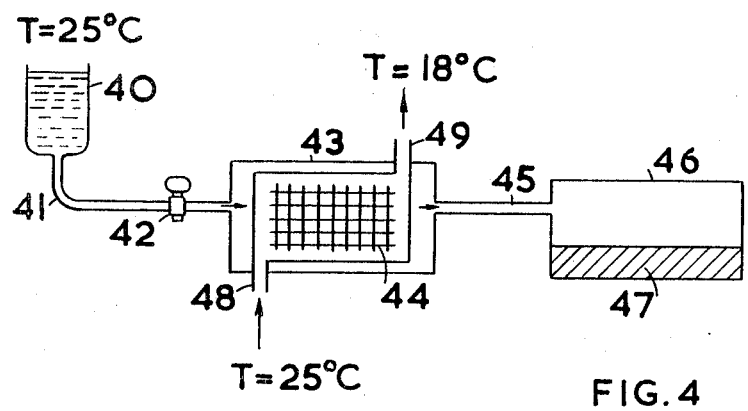
Figure 5:
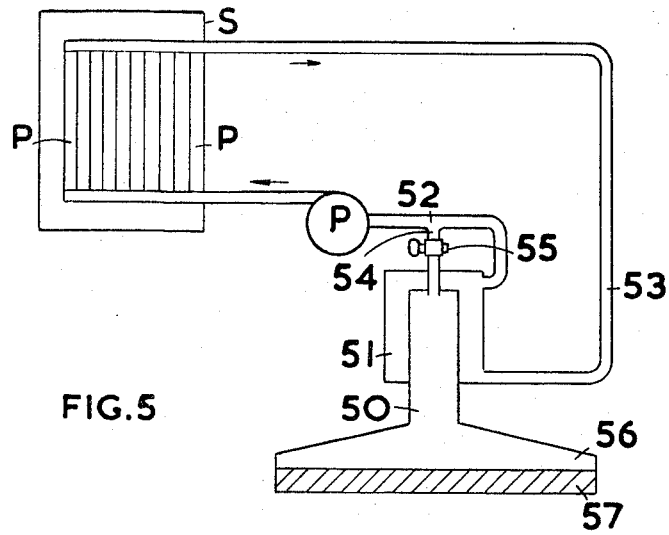
Figure 6:
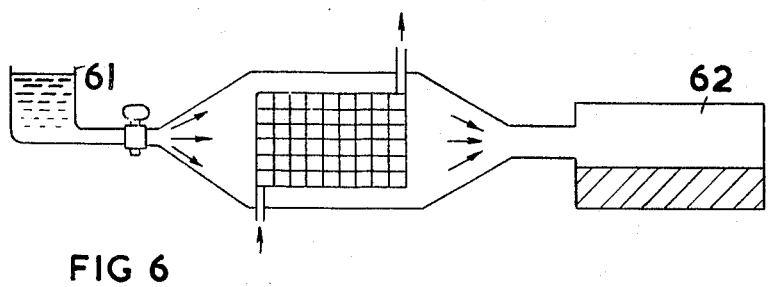
Figure 7:
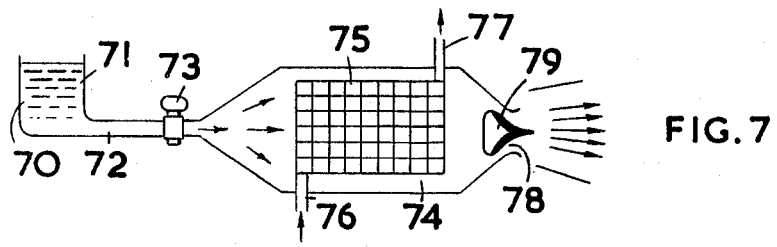
Figure 8:
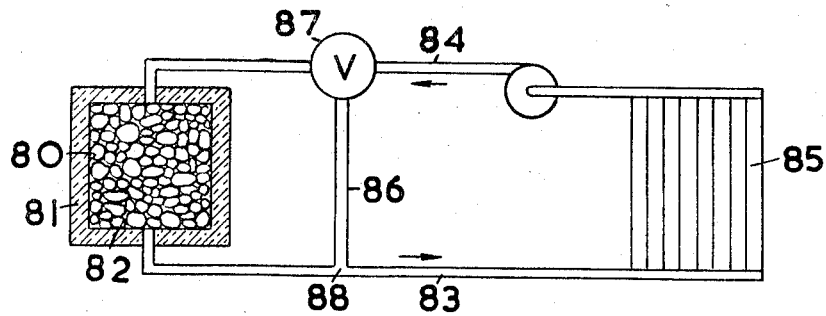
Figure 9:
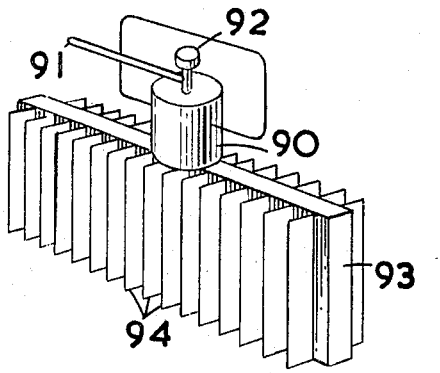
Figure 10:
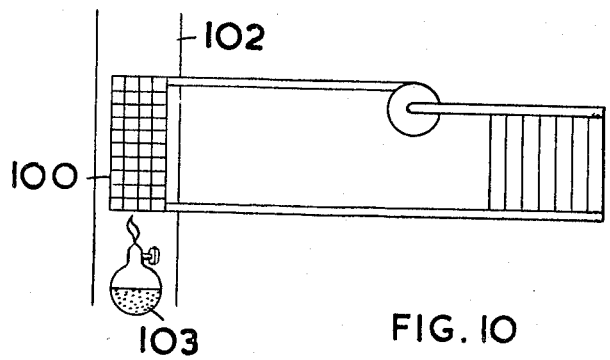
Figure 12:
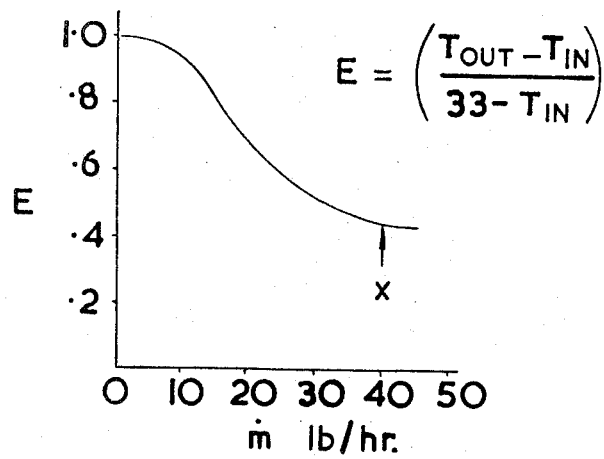
Figure 11:
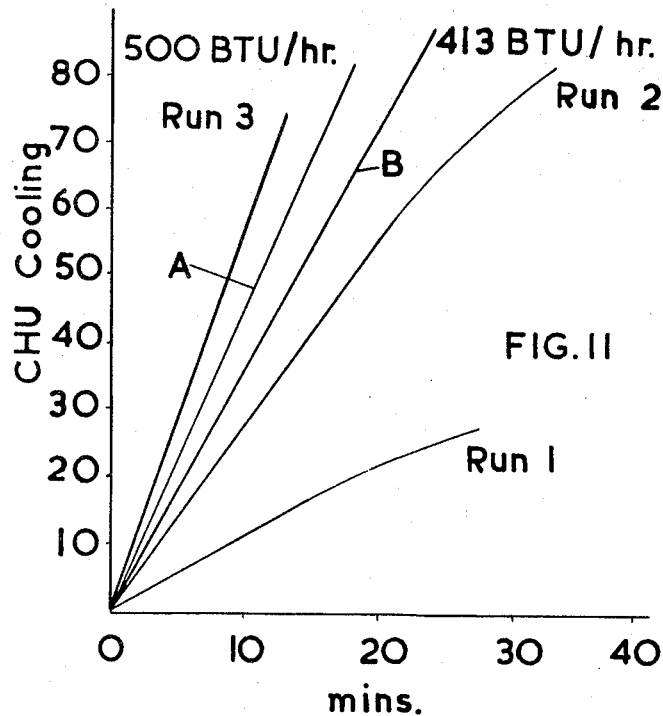

FIGURE 3 shows a basic form of evaporator connected with an absorber chamber containing a desiccant, FIGURE 4 shows another form of combined apparatus including an evaporator chamber which houses a separate heat exchanger and is connected with an absorber chamber containing a desiccant, FIGURE 5 is another form of the apparatus of FIGURE 4 in which the heat exchanger is a jacket around the evaporator chamber, FIGURE 6 is a modification of the apparatus of FIGURE 4, FIGURE 7 is a modification of the apparatus of FIGURE 2, FIGURE 8 is a form of the apparatus using melting ice as a coolant, FIGURE 9 shows a portable form of evaporator chamber and heat exchanger, FIGURE 10 shows the apparatus adapted to heat circulating water, FIGURE 11 gives test results of a typical evaporator/cooler of the type shown in FIGURE 4, and, FIGURE 12 illustrates the efficiency of one form of the apparatus.

Figure 1:
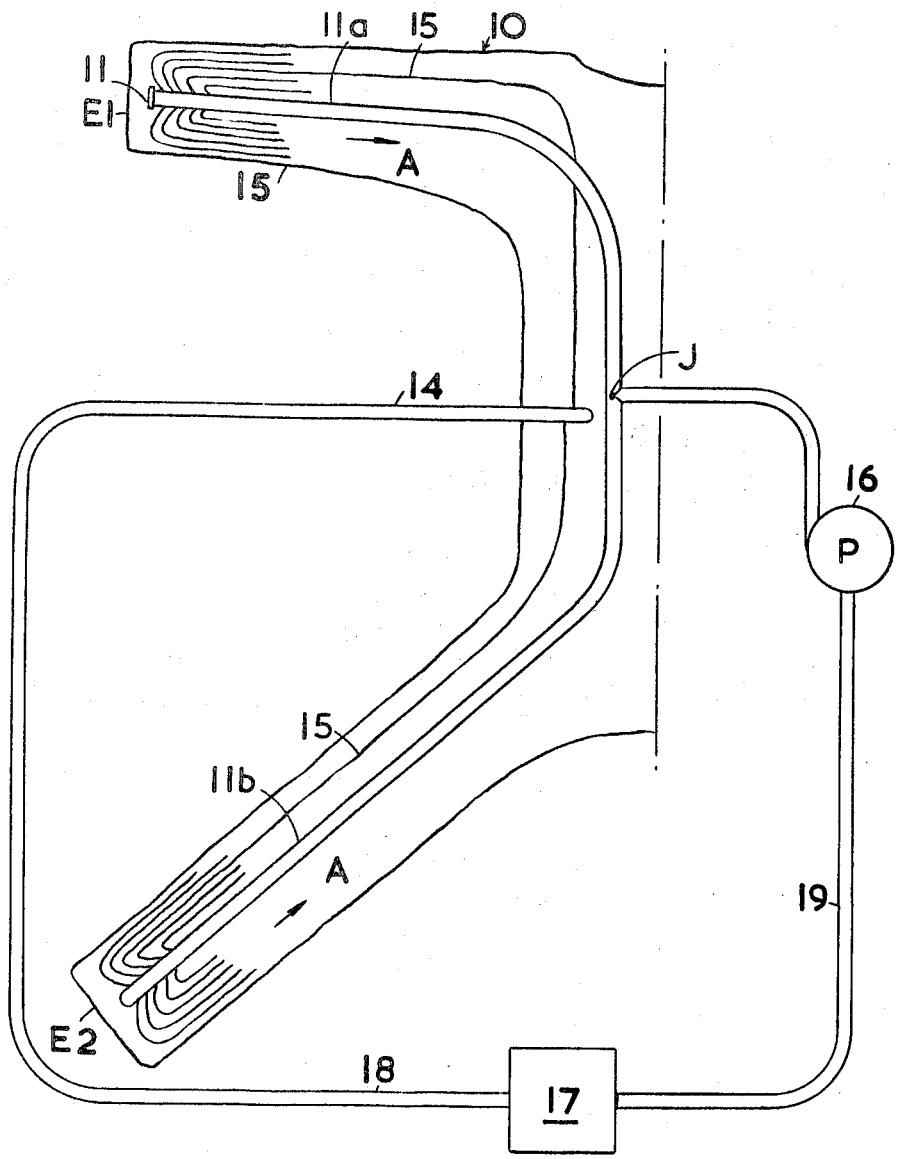
FIGURE 1 is half of a pressure suit garment showing the pipework.

Referring to the drawings, FIGURE 1 shows the outline 10 of one half of the pressure suit. Within the suit there is an inlet manifold 11 which is divided into two parts 11a and 11b at a junction J in the region of the centre of the suit near the abdomen of the supposed wearer. The halves of the manifold 11a and 11b lead to the extreme ends E1 and E2 of the arm and leg portions of the suit respectively. In the same central region of the suit, there is an outlet manifold 14. Within the suit the ends of the inlet manifold in the regions E1 and E2 are in fluid connection with a number of small bore flexible conductive pipes as at 15 which run from the ends E1 and E2 along the length of the extremities towards the centre portion of the suit where they are connected with the outlet manifold 14.

The apparatus is completed by a pump 16 and a cooler 17 connected in a liquid flow circuit formed by the pipes 18 and 19 as shown, whereby a continuous flow of the liquid through the small bore pipes within the suit may be maintained in the direction of the arrows A from the extremities E1 and E2 towards the centre of the suit.

A simple form of cooler suitable for use with the apparatus of FIGURE 1 is shown in FIGURE 2. The cooler consists of an evaporator chamber 20 in the form of a hollow tube of conductive material. The end 20a of the tube 20 is connected to a source of vacuum. As has been explained this may be a vacuum pump or an environment of low pressure. The end 20b of the tube 20 is connected by a pipe 21 with water in a water reservoir 22. A small bore control valve 23 is interposed in the pipe 21 so that the water flowing to the evaporator chamber may be accurately metered. In operation, when the control valve 23 is opened, the low pressure draws water from the reservoir into the evaporator chamber where it expands and cools the inner wall of the tube 20. The tube 20 is enclosed by the water jacket 24 having an inlet 25 and an outlet 26 through which the suit cooling water is circulated, the cooling water thus becoming cooled by contact with the outer service of the tube 20. The disadvantage of this simple form of cooler is that the expanding liquid drawn from the reservoir 22 is lost.

A simple reversible cooler is shown in FIGURE 3 in which the expanding liquid is condensed and absorbed in a desiccant. The apparatus comprises two chambers 30 and 31 connected by a pipe 32 of relatively small dimensions. The chamber 30 is a water reservoir the wall of the chamber 30 being of conductive material and surrounded by a water jacket 34. Connections 35 and 36 are made with the water jacket 34 whereby cooling water from the suit may be passed through the jacket. The chamber 31 contains a desiccant 37 which is initially substantially water-free. The operation of this form of cooler is that water from the suit heated by contact with wearer's skin passes through the water jacket 34 and gives up heat to evaporate the water 33. The evaporated water flows through the pipe 32 and is condensed in the chamber 31 and absorbed by the desiccant 37. The life of this form of a cooler is determined by the time which is takes to dissolve the desiccant entirely in the condensed evaporated water. This apparatus is reversible and reversing is performed by heating the chamber 31 to drive the water out of the desiccant 37. The water evaporated by heat passes through the chamber 32 in the reverse direction and will condense out in the chamber 30 to restore the cooler to the condition it was in at the beginning of the cycle. It will be understood that two such coolers may be provided working in sympathy so that one acts to cool the water flowing from the suit whilst the other is being reversed by heat as described.

A further form of evaporator is shown in FIGURE 4. This consists essentially of a water reservoir 40 connected by a pipe 41 in which there is an adjustable metering valve 42 with an evaporator chamber 43 within which is situated a heat exchanger 44. The chamber 43 is connected by pipe 45 to a desiccant chamber 46 in which the desiccant is shown at 47. The heat exchanger 44 has inlet and outlet connections 48 and 49 through which water from the suit is passed. The chamber 46 is initially evacuated to a low pressure. The operation of the device is similar to that of FIGURE 2, namely that the low pressure in the chamber 46 draws water through the control metering valve 42 from the reservoir 40 into the evaporator chamber 43 in which it expands thus gaining heat and thereby cooling the matrix of the heat exchanger 44. After expansion it passes through the tube 45 into the desiccating chamber 46 where it is absorbed by the desiccant 47. The water from the suit which passes through the exchanger matrix via the connections 48 and 49 is also cooled by the evaporated liquid within the evaporating chamber 43 and is passed back to the extremities E1 and E2 of the suit as shown in FIGURE 1. The operating period of this form of apparatus is determined by the quantity of desiccant as eventually, of course, the desiccant is no longer able to absorb to real effect. As an obvious alternative to providing the desiccant chamber 46, the pipe 45 may simply be connected to a continuous source of vacuum in which case the operating period of the apparatus is determined by the quantity of water in the reservoir 40. In the form including the desiccant chamber 46, the cooler of FIGURE 4 is reversible as in the case of FIGURE 3, heating the desiccant chamber serving to drive the evaporated and condensed water contained in the dissolved desiccant back through the chamber 43 and the valve 42 into the reservoir 40.

FIGURE 5 shows a simplified form of apparatus as connected to a suit which is shown diagrammatically at S, the small bore pipes being shown at P. The apparatus consists of an expansion chamber 50 surrounded by a water jacket 51 to which is connected the feedpipe to the suit at 52 and the return pipe from the suit 53. The connection 54 is made between the pipe 52 and the interior of the chamber 50 by means of a metering valve 55. The chamber 50 is shown coupled to a desiccant chamber 56 containing a desiccant 57 and in operation the chamber 56 is initially evacuated. This form of cooler functions as follows: water from the suit heated by contact with the wearer's skin passes into the water jacket 51 and out through the pipe 52 from which a measured amount is bled via the valve 55, being drawn through by the low pressure within the desccant chamber 56. The supply entering the chamber 50 expands on entering and thus cools the interior walls of the chamber 50 and thereby lowers the temperature of water passing through the water jacket 51. The evaporated water within the chamber 50 passes into the desiccant chamber 56 where it condenses and is absorbed by the desiccant 57. In operation, the supply of water passing through the suit is gradually exhausted by the amount which is bled through the connection 54 and valve 55 into the evaporator or expansion chamber 50 until eventually the desiccant is no longer absorbent. As in the case of FIGURE 3 and 4 the apparatus can be reversed by heating the desiccant chamber to drive off the water.

The cooling apparatus shown in FIGURE 6 is a simple modification of the apparatus of FIGURE 4, the difference being that the chamber 61 is a reservoir for a limited quantity of refrigerant water which passes to the evacuated desiccant chamber 62 when the apparatus is in use. Cooling apparatus of this type could be made readily portable and reversible simply by heating the desiccant chamber.

An alternative form of portable cooler including an expendable supply of refrigerant to that of FIGURE 6 is shown in FIGURE 7. The components of the apparatus are similar including a reservoir 70 filled with refrigerant water 71 connected by a pipe 72, in which there is a metering valve 73, with an evaporator chamber 74. The evaporator chamber 74 houses a heat exchanger 75 through which suit cooling water is passed vit inlet and outlet pipes 76 and 77 respectively. The outlet end of the chamber 74 includes an annular expansion nozzle 78 formed by the rim of the chamber and a control member 79, the nozzle communicating with environmental pressure of very low value and equivalent to the evacuation pressures that may be generated, for example, by the vacuum pump described in connection with the apparatus of FIGURES 2 or 4. In operation, when the metering valve is opened to permit a flow of the refrigerant water under the influence of the external low pressure, the refrigerant expands in the chamber 74 thus gaining heat and cooling the heat exchanger 75 and hence cooling the suit cooling water being pumped through the exchanger. The vapour refrigerant passes to environment via the expansion nozzle 78, the nozzle acting to maintain a predetermined level of pressure above environmental pressure within the chamber 74. The period of operation of the apparatus of FIGURE 7 is determined by the capacity of the reservoir 70 and rate of use of the water.

The apparatus of FIGURE 8 is likewise a portable device including an expendable supply of coolant. The apparatus consists of a coolant chamber 80 which is housed in an insulating jacket 81 and is, in use, filled with melting ice 82. The flow and return pipes 83 and 84 connecting the chamber 80 with the suit 85 are connected by a by-pass 86 joined to the flow pipe 83 by a three way valve 87, the valve 87 being adjustable to vary the amount of suit cooling water flowing from the suit through the melting ice in the chamber 80. The flow through the chamber 80 is adjusted to control the mixed outlet water temperature leaving the bypass junction 88 at the required value.

FIGURE 9 shows a portable form of a combined evaporator/absorber cooler operating on the principle of the coolers of FIGURES 4 or 5. The cooler consists of an evaporator/cooler chamber 90 to which a measured amount of the suit cooling water is fed via a pipe 91 and metering valve 92, this measured amount being evaporated within the chamber 90 as a refrigerant to produce the desired cooling effect. The chamber 90 also contains the matrix, not shown, of a heat exchanger through which flows the whole of the suit cooling water except the small amount used for expansion cooling. An absorber chamber 93, in the form of a flat box with external heat conductive fins 94 is connected with the evaporator chamber 90. The absorber chamber contains a desiccant initially water free. This form of apparatus functions in a similar manner to that of FIGURES 4 and 5, the period of operation being determined by the amount of desiccant.

FIGURE 10 shows a simple arrangement for heating the suit of FIGURE 1, the heat exchanger 100 being similar in principle to that of any of FIGURES 4, 6 or 7 but being housed in a duct 102 which contains a heating appliance 103, shown as a butane burning stove.

FIGURE 11 is a series of graphs showing test results achieved by a simple evaporator cooler as shown in FIGURE 2 at different tap settings. The ordinate scale represents the centigrade heat unit measurement of the cooling effect and the abscissa the time scale in minutes. The curves A and B represent typical comfort levels in different circumstances as may be experienced by an aviator, curve A indicating a heat loss of 500 B.t.u.'s per hour and curve B a loss of 413 B.t.u.'s per hour. Curves I, II and III show the results achieved and it will be seen that the comfort range is well within the range of performance of the apparatus.

FIGURE 12 is a graph showing the efficiency of a suit similar to that of FIGURE 1 in terms of temperature drop achieved in relation to an ideal temperature assuming, as is usual, a skin temperature of 33° C. The figures apply, of course, to a suit of particular characteristics. In this case the cooling system consisted of ten small bore pipes, internal diameter 1.5 mm. connected with manifolds of internal diameter 4.0 mm. It will be understood of course, that another suit having different pipe sizes and water capacity etc. would have a different performance. The ordinate of the graph is the efficiency E, in terms of $$E = \left(\frac{T_{out} - T_{in}}{33 - T_{in}}\right)$$

and the abscissa is the coolant water flow rate per tube in lb./hr. It has been found satisfactory with one suit to operate at a flow rate in of 40 lb./hr. as shown in the graph at point X giving an efficiency of about 0.4.

Concerning the design of apparatus according to the invention, it has been found to be convenient to employ the following formula for predicting the pressure drop in the tubes:

$$\Delta P = \left(\frac{128 \dot{m} l \mu}{\rho g \pi D 4}\right)$$

when $\dot{m}$ is the flow of cooling water in lb./hr. per tube,
$l$ is the length of the tube, in feet
$\mu$ the viscosity of water in lb./ft. hr.
$\rho$ the density of water in lb./ft.$^3$
$g$ an acceleration constant in ft./hr.$^2$, and
D is the tube diameter in feet.

In designing a suit to fulfill a particular requirement the sequence of design steps is to determine (a) the heat loss requirements of the wearer, (b) the weight of water required, (c) the pressure drop across the small bore pipe system, measuring inlet and outlet pressures in the manifolds, and (d) the choice of pipe arrangement and pump applying the above formula. It will be obvious that the manifolds themselves and the connections of the small bore pipes with them must be such as to cause as little pressure drop as possible so that calculations can be based primarily on the characteristics of the small bore pipes.

Generally speaking, the various types of apparatus described in the foregoing have a limited working life determined in some cases by the capacity of the suit pipe system (that is where a small proportion is bled into the evaporator/cooler as an expanding refrigerant) and in others by the initial capacity of the refrigerant reservoir or coolant liquid. It will be understood, however, that the period of operation of the suit or apparatus is generally determined solely by the capacity or supply of coolant.

The advantages of the liquid, particularly water-cooled, apparatus of the invention compared with air-cooled apparatus for the same duty include an enormous reduction of pumping power of the coolant by as much as 3300 times. This permits the operation of the apparatus as smaller temperature differences between the skin and the coolant and hence a reduction of the insulation between the coolant pipes and the skin.

I claim:

1. Apparatus for controlling the temperature of a human body comprising a garment consisting of at least a trunk portion, and a liquid circuit including a system of liquid carrying pipes so attached to the garment that at least a proportion of the exposed inner face of the garment is formed of exposed pipe wall, the pipes running generally outwardly from the central region of the trunk portion and so connected in the liquid circuit that liquid will flow through the several pipes in the same sense in relation to the central region, the circuit having means whereby temperature control and circulation of the liquid is effected, said temperature control means being a heat exchanger of the heat absorption type which is operative to cool the circulating liquid, said heat exchanger including a container, refrigerant liquid in the container, an expansion chamber connected with the container to receive refrigerant liquid, a heat exchanger matrix positioned within the chamber and having external fins and internal fluid passageways through which passageways the circulating liquid circulates, and refrigerant liquid metering means located between the container and the chamber through which metering means the refrigerant liquid may pass and expand into the chamber in vaporous form, flow through and over the matrix thereby cooling the circulating liquid circulating through the matrix.

2. Apparatus for controlling the temperature of a human body comprising a garment consisting of trunk, leg, and arm portions, and a liquid circuit including a system of liquid carrying pipes so attached to the garment that at least a proportion of the exposed inner face of the garment which will contact the body of a wearer of the garment is formed of exposed pipe wall, the pipes running generally outwardly from the central region of the trunk portion, manifold means in the central region connected with an end of each pipe, manifold means at the extremities of the leg and arm portions and connected with the other ends of the pipes, the circuit being completed by a conduit system independent of the pipes and connecting the central manifold to each of the other manifolds and including means for circulating and temperature conditioning means in the liquid circuit being a heat exchanger of the heat absorption type which is operative to cool the circualting liquid, said heat exchanger including a container, refrigerant liquid in the container, an expansion chamber connected with the container to receive refrigerant liquid, a heat exchanger matrix positioned within the chamber and having external fins and internal fluid passageways through which passageways the circulating liquid circulates, and refrigerant liquid metering means located between the container and the chamber through which means the refrigerant liquid may pass and expand into the chamber in vaporous form, flow through and over the matrix, thereby cooling the circulating liquid circulating through the matrix.

References Cited by the Examiner

UNITED STATES PATENTS

| 2,260,134 | 10/1941 | Ballman | 165—46 |
| 2,731,808 | 1/1956 | Stark | 165—46 |
| 2,933,903 | 4/1960 | Kovalsky | 62—259 |
| 3,211,216 | 10/1965 | Coleman et al. | 165—46 |

FOREIGN PATENTS

| 746,650 | 1/1944 | Germany. |

ROBERT A. O'LEARY, Primary Examiner.

CHARLES SUKALO, Examiner.